Figures 1, 2:
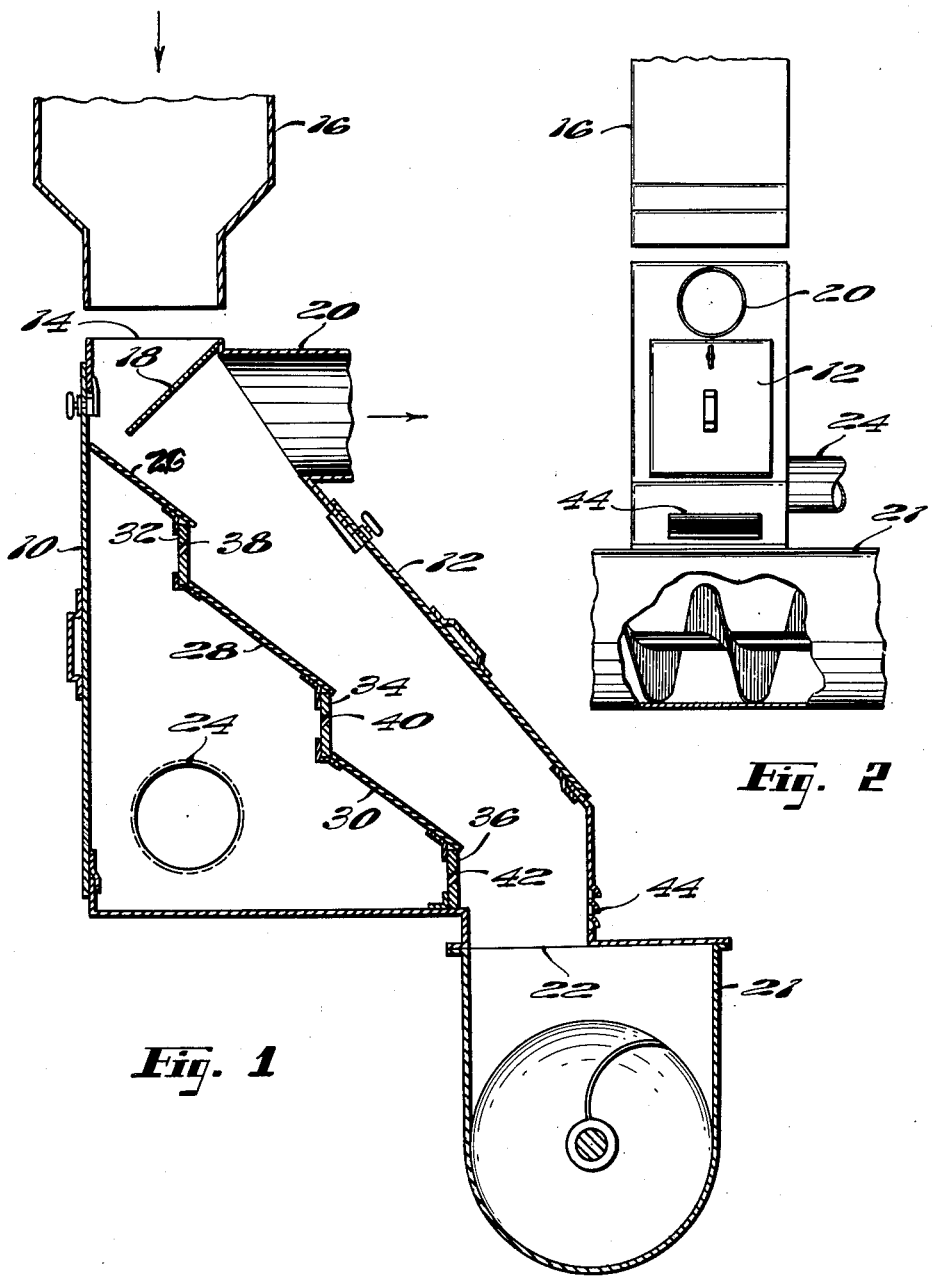

INVENTOR.
Robert S. P. Vail

2,973,862
PROCESS AND APPARATUS FOR FRACTIONATING SOLID MATERIALS

Robert St. P. Vail, Pampa, Tex., assignor to Cabot Corporation, Boston, Mass., a corporation of Delaware Filed Jan. 31, 1956, Ser. No. 562,509

4 Claims. (Cl. 209—136)

This invention relates to a process and apparatus for separating fines from solid materials. It is particularly useful for the separation of dust from carbon black pellets.

It is common practice in many industries to separate solid materials into fractions of various sizes. When the individual fragments or particles of the material are of substantial strength and size screens are quite adequate for the purpose. However, when the material contains particles in the dust range, i.e., below about 35 mesh in size, screening becomes difficult because of blinding of the pores. Such blinding is a particular problem in the separation of carbon black and other fragile and sticky materials such as plastic resins. While operation of screens can be prolonged by various pore cleaning means such as vibrating, brushing, rolling, etc., none of these means is really satisfactory because the cure tends to aggravate the disease by attrition of material and creation of even more dust.

The alternative method of dust separation employing air floating or conveying has been only indifferently successful because the apparatus heretofore available has been bulky, complicated, expensive and very tempermental to operate. While this invention involves air separation it accomplishes its objects in a novel, simple and foolproof manner quite unlike anything previously known in the art.

It is the principal object of this invention to provide a novel process and apparatus for gently separating the smaller from the larger particles of a mass of material composed of the same by means of a stream of gas flowing through and over a cascade of such material.

It is another object to provide such a process and apparatus which is insensitive to minor variations and which will consistently achieve the desired separation over extended periods of time.

It is a specific object of this invention to provide such a process and apparatus for removing the dust from carbon black pellets and similar fragile dusty and sticky materials.

A further object is to provide a simple and inexpensive apparatus which can be used for fractionation of many different types of particulate material with a degree of efficiency and accuracy not hitherto attained by other apparatus designed for the same purpose.

The various objects of this invention are achieved by flowing the material to be fractionated in a cascade over a series of sloping steps while flowing a gas at spaced intervals through the mass of cascading material and flowing additional gas continuously upwardly over the surface of the material. The gas employed is preferably air but may be any gas which is compatible with the material being treated. By varying the velocity of gas flow fractions of selected maximum particle size can be completely removed from the rest of the material.

This invention will better be understood and appreciated from the following detailed description thereof taken in connection with the accompanying drawings in which:

Fig. 1 is a side view in vertical cross section of the apparatus of the invention, and Fig. 2 is view of the front end thereof.

The apparatus is essentially an enclosed container having a bottom and generally vertical side and back walls secured thereto. The back wall 10 is preferably removable for inspection and cleaning. The front wall 12 is sloping and likewise is preferably removable for the same purpose. The apparatus has an open inlet 14 at the top for solid material feed from hopper 16 or other suitable source and is provided with a sloping baffle 18 to divert gas flow to outlet 20. An outlet 22 is provided at the bottom for discharge of the large particle size fraction to a storage tank or to a conveyor such as screw conveyor 21. Outlet 20 for discharge of gas and suspended small particles is provided at the top adjacent the solid feed inlet 14. A gas inlet 24 is provided in the lower back area of the apparatus and preferably opens through one of the side walls.

Within the container is the cascade section comprising a series of sloping steps 26, 28 and 30 and perforate risers 32, 34, and 36. These elements are secured to the side walls in such manner that substantially no gas can flow past their edges but only through orifice slots 38, 40 and 42 in the risers and the risers may advantageously be readily removable or have means for altering the size of the slot openings. The slots extend substantially the length of each riser and are preferably directed more or less perpendicular to the sloping front wall 12. Instead of slots a plurality of small orifices may be employed. A louver 44 is advantageously mounted in the front wall of the outlet section.

The process of this invention in its preferred embodiment is carried out in the described apparatus as follows. Suction is applied to outlet 20 by means of a fan and appropriate conduits (not shown). Solid material is introduced into the inlet 14 in a continuous flow and cascades down the steps 26, 28 and 30 to the outlet 22. At the same time air is introduced into the area behind the steps through inlet 24 under moderate pressure and escapes through orifice slots 38, 40 and 42 to flow through and "float" the mass of cascading material. Due to the suction applied to the outlet 20, air is drawn into the solids outlet section 22 through louver 44 and the open end mounted above the screw conveyor and mingles with that inflowing through the orifices. The total effect is thus to loosen and dilute the cascading mass of solid material and to separate out and carry upward those particles which are light enough to be carried in the air stream traveling at the selected velocity.

It will be seen that the degree of separation achieved in this novel process and by means of this novel apparatus is variable over a wide range. In practice it has proven to be highly selective to make sharp cuts at desired division points. The sensitivity of operation according to this invention will be demonstrated in the examples appearing hereinafter.

While the process is preferably carried out by application of suction to outlet 20 it is obvious that it can equally be practiced under positive pressure. An essential requirement is, of course, a volume or velocity of gas flow through and over the cascading material sufficient to achieve the desired extent of fractionation.

Another requirement of the process, and of course of apparatus construction, is that the slope of the cascading element be greater than the angle of repose of the material being separated. If the slope is too gentle the material will pile up and choke off flow; if it is too steep the flow of material will be too rapid and separation will be incomplete. So the apparatus will be designed for the expected service and may be made adjustable for divers uses. When carbon black pellets are being treated to eliminate dust a step slope of 30° to 45°, preferably of 35° to 40° from the horizontal will be employed. For very free flowing materials such as catalyst beads a slope of 20° may be sufficient while for very sticky material such as powdered mineral ore the slope may have to be as great as 50° or more.

As has been indicated above the velocity and volume of the gas flow up through the passage between the cascade staircase and the front wall is largely determinative of the extent of separation that will be accomplished. At relatively low velocities and volumes only the very finest particles will be suspended in and carried out of the apparatus by the gas and conversely at high velocities and volumes particles of substantial size will be removed. The optimum flows for any given degree of separation can readily be determined by trial and once the apparatus is calibrated will be consistently reproducible. Naturally, a few variables including particle density and shape and the properties of the lifting gas must be considered but unlike prior art air separators are not subject to fluctuation once determined because of the stabilizing effect of the supported cascade. In any event, the necessary operating condition can readily be calculated by reference to standard tables such as those contained in Perry's Handbook and others.

In the following table there are set forth representative data selected from a series of runs with oil furnace carbon black pellets in accordance with this invention in apparatus having the following dimensions:

| | |
|---|---|
| Vertical height | 2½ ft. |
| Width | 10 in. |
| Stair treads 26, 38 and 30: | |
|    Length | 8 in. |
|    Slope | 35° |
| Height of risers, 32, 34 and 36 | 2¾ in. |
| Air outlet 20 | 7 in. I.D. |
| Air inlet 24 | 6 in. I.D. |
| Solids outlet 22 | 4½ in. I.D. |
| Distance from outer ends of stair treads to cover 12 | 6 in. |
| Width of orifice slots 38, 40, 42 | 3/16" set at 45° angle to horizontal. |

Table

| Run No. | 35 | 37 | 38 | 40 | 41 | 42 | 44 | 46 |
|---|---|---|---|---|---|---|---|---|
| Air flows, c.f.m.: | | | | | | | | |
|   Through inlet 24 | 92 | 65 | 65 | 65 | 65 | 65 | 65 | 65 |
|   Total | 102 | 144 | 102 | 92 | 120 | 120 | 119 | 135 |
| Pellet feed, lbs./hr | 650 | 650 | 650 | 600 | 750 | 1,350 | 1,080 | 1,080 |
| Percent—100 mesh dust in feed | 7.8 | 4.4 | 4.4 | 5.5 | 4.7 | 9.1 | 11 | 8 |
| Percent—100 mesh dust in product | 0.6 | 0.8 | 0.4 | 1.5 | 0.4 | 3.8 | 5.2 | 4.2 |
| Rotap, percent dust in feed | 10.8 | 11.6 | 11.6 | 9.6 | 14.7 | 14.5 | 16.4 | 17.5 |
| Rotap, percent dust in product | 5.4 | 5.6 | 4 | 4.9 | 6.1 | 8.8 | 9.1 | 12.5 |

The dust content of the carbon black pellets before and after passing through the separator of this invention was determined by shaking the pellets for three minutes on a set of stacked Tyler mesh size screens. The Ro-Tap values were obtained by vibrating 25 grams of the pellets for 20 minutes on a 100 mesh screen mounted in the Ro-Tap machine which imparts a compound up and down and sidewise motion to the screen. The results are recorded as percent of black passing through the screens in each case.

It will be noted from the table that at higher pellet flow rates the percentage of dust separated out is somewhat less than at lower rates when the total air flow remains the same. Increasing air flow does not appear entirely to offset the effect of higher pellet flow although dust separation is still substantial. I conclude, therefore, that there is an optimum range of flow rates for both air and solid materials at which substantially complete separation of fines will be accomplished. Thus, with a stair tread slope of 35° air velocity should be in the range of 250–450 ft. per minute with 360 ft./min. being about optimum. Rates will be changed for different slopes and materials as practice will indicate. At all events, the efficiency of separation achieved by the practice of this invention is substantially greater than that for any other processes and apparatus of which I am aware.

It will be seen from the description of the specific apparatus used in the above examples and the general arrangement depicted in the drawing of Figure 1 of the drawings that the uppermost wall 12 is disposed as a flat plane sloping at such an angle that it is equidistant from each step of the stair flight when measured from corresponding points on said steps along a normal to said planar wall. It can, therefore, be said that the angle of slope of said wall 12 is substantially the same as the average slope of the entire stair flight where the "average slope of the entire stair flight" is defined as the angle between the horizontal and a straight line running from the top of the top step to the bottom of the bottom step in said stair flight.

An improvement in the art achieved by my invention is the great increase in separation capacity per unit size achieved thereby. Apparatus of the size above described is capable of processing up to 50,000 pounds of carbon black pellets per 24 hour day, something which no other apparatus can do. Furthermore, it so operates that no important degradation of product is caused. Carbon black pellets, for example, are relatively friable and soft. Fluidization separation techniques would break up so many pellets by attrition that the benefits achieved by reduction of dust would be far outweighed by loss of product. With the process and apparatus of this invention the material undergoing fractionation floats down the stairway on an air cushion and touches hard surfaces only lightly.

It will also be evident that the process and apparatus of this invention may be employed to separate materials of similar particle size but different densities.

Having thus described my invention, I claim:

1. A process for removing dust and fragments from pelletized carbon black without damaging the properly formed pellets therein comprising flowing the dusty pellets in a continuous cascading stream angularly downward over a series of flat sloping surfaces located in regular stepwise fashion one below another, cushioning the fall of said cascading stream from one sloping surface to the next by steadily blowing uniform jets of gas up through said cascading stream as it drops from each sloping surface to the next lower one, simultaneously flowing more gas continuously from an entirely separate and independent source directed so as to sweep solely over the upper surface of said cascading stream but in a direction generally countercurrent to the angularly downward movement of said cascading stream, controlling the intensity of the gas jets up through said cascading stream and the volume of gas sweeping over the upper surface of said cascading stream so as to effect the desired lifting of dust and fragments from the cascading stream without substantially lifting or fluidizing the pellets therein, removing the dust and fragments entrained in the gaseous effluent taken off adjacent the highest sloping surface in the said series of sloping surfaces and removing the dedusted pellets intact as they leave the lowest sloping surface in the series.

2. The process of claim 1 in which air is used as the gas throughout the process.

3. Apparatus for fractionating free-flowing solid materials which comprises a container divided internally by a flight of stairs therein into two separate compartments one above and one below said stair flight, the flat tread on each step of said stair flight sloping at about the same angle, this being greater than the angle of repose of the said material to be fractionated therein, relatively short vertical risers connected between adjacent stair treads, orifices of uniform size and direction in said risers, means to supply gas from a source outside said container to the compartment below said stair flight, the wall of said container which is directly opposite the upper surface of said stair flight being disposed as a substantially flat plane slanting at an angle substantially equal to the average slope of the entire stair flight, means for feeding the free-flowing solids to be fractionated onto the top tread of said stair flight, means for withdrawing the fraction of said free-flowing solids which finally slides off of the bottom tread of said stair flight, an opening in one of the outer walls of the compartment above said stair flight near the foot of same, a conduit leading out of the top of the compartment above said stair flight and located away from said stair flight, and means for supplying gas to said opening and withdrawing gases laden with entrained solids through said conduit.

4. Apparatus for fractionating free-flowing solid materials which comprises a container divided internally by means of a flight of stairs into two separate chambers, an upper chamber above said stairs and a lower chamber behind said stairs, said stairs being made up of flat sloping treads and vertical risers, each of said treads sloping at the same angle which is between about 20° and 50° to the horizontal, the upper wall of said upper chamber being disposed as a flat plane sloping at an angle about the same as the average slope of the entire stair flight, an orifice slot in each of said vertical risers extending substantially the full width of same and directed substantially perpendicular to the slope of said treads, a bifurcated opening in said upper chamber at the head of the stair flight and a baffle extending from the point of bifurcation toward the stair flight, an opening in an outer wall of said upper chamber at the foot of the stair flight, an opening in an outer wall of said lower chamber, means to supply gas independently to the last two mentioned openings and to withdraw gases containing fine solids entrained therein from the branch of said bifurcated opening below the baffle, means to deliver solid material to the other branch of the bifurcated opening and means to withdraw from said upper chamber the coarse solid material as it falls from the lowest tread of the flight of stairs.

References Cited in the file of this patent

UNITED STATES PATENTS

| | | |
|---|---|---|
| 485,962 | Meinicke | Nov. 8, 1892 |
| 533,529 | Cornwall | Feb. 5, 1895 |
| 843,783 | Wilson | Feb. 12, 1907 |
| 1,073,451 | Weaver | Sept. 16, 1913 |
| 1,650,727 | Stebbins | Nov. 29, 1927 |
| 2,328,568 | Maxwell et al. | Sept. 7, 1943 |
| 2,511,088 | Whaley | June 13, 1950 |

FOREIGN PATENTS

| | | |
|---|---|---|
| 413,294 | Great Britain | July 11, 1934 |